(12) United States Patent
Chavez

(10) Patent No.: US 6,783,098 B1
(45) Date of Patent: Aug. 31, 2004

(54) ANTI-HIJACKING SECURITY DEVICE, KIT AND METHOD

(76) Inventor: Victor J. Chavez, 1466 W. 800 South St., Salt Lake City, UT (US) 84104

( * ) Notice: Subject to any disclaimer, the term of this patent is extended or adjusted under 35 U.S.C. 154(b) by 0 days.

(21) Appl. No.: 10/441,293

(22) Filed: May 15, 2003

(51) Int. Cl.$^7$ ................................ B64D 11/00
(52) U.S. Cl. .................................... 244/118.5
(58) Field of Search .................. 244/118.5, 129.4, 244/129.5, 1 R; 109/3, 6

(56) References Cited

U.S. PATENT DOCUMENTS

| | | | | |
|---|---|---|---|---|
| 3,068,810 A | * | 12/1962 | Kaloshin | 109/3 |
| 3,704,845 A | * | 12/1972 | Ord | 244/118.5 |
| 4,121,790 A | * | 10/1978 | Graham | 244/118.5 |
| 6,499,693 B1 | * | 12/2002 | Rogson | 244/118.5 |
| 6,641,088 B2 | * | 11/2003 | Suchar | 244/118.5 |
| 2003/0058112 A1 | * | 3/2003 | Glaine | 244/117 R |

FOREIGN PATENT DOCUMENTS

| | | | | |
|---|---|---|---|---|
| DE | 2210312 | * | 3/1972 | 244/118.5 |
| FR | 2641397 | * | 7/1990 | 244/118.5 |

* cited by examiner

Primary Examiner—Galen Barefoot

(57) ABSTRACT

An anti-hijacking security device, an associated kit for constructing the device and a method of using the kit for thwarting a hijacking event within an airplane are disclosed. The device includes a pressurized gas container, an incapacitating chemical agent, and an emergency control system. The pressurized gas container is operatively connected to the internal air ventilation system of the airplane. The incapacitating chemical agent is stored within the pressurized gas container. The emergency control system includes a gas release switch operatively connected to the pressurized gas container for the controlled release of the incapacitating chemical agent through the air ventilation system in the airplane. The kit includes the unconnected components of the device. The method of using the kit includes the steps of adjoining, affixing, assembling, attaching, bolting, connecting, coupling, erecting, fastening, joining, linking, locking, mounting, obtaining, and welding.

2 Claims, 2 Drawing Sheets

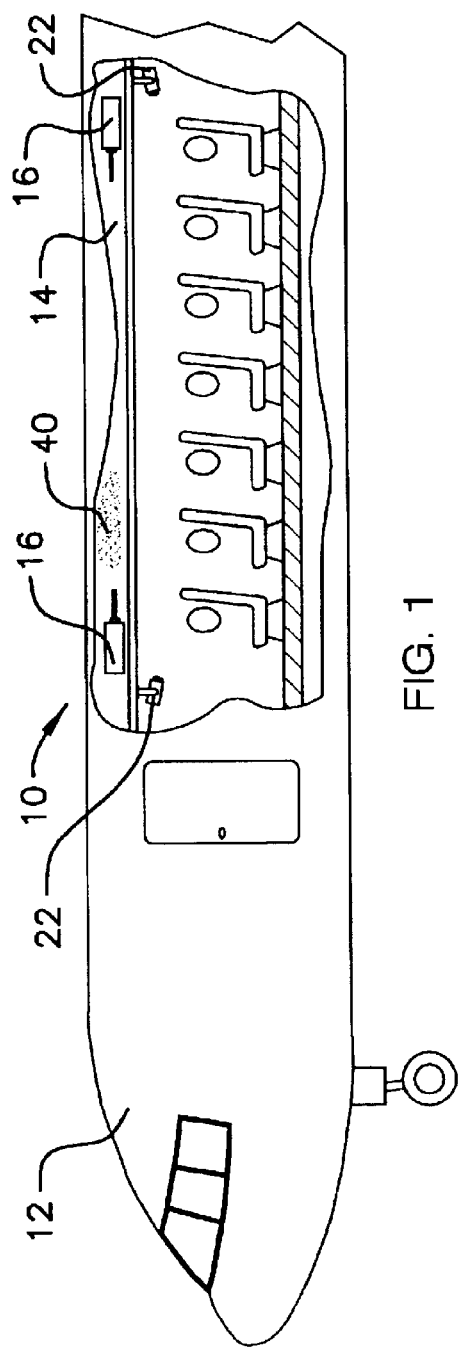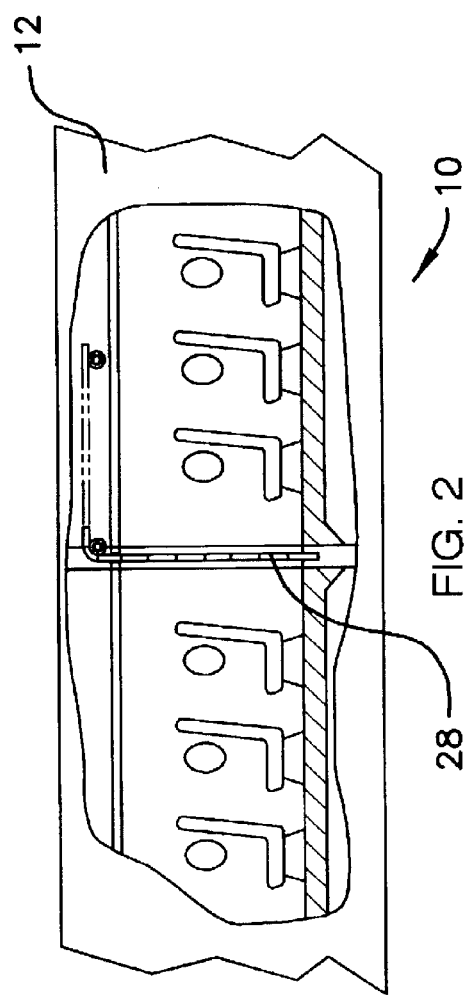

ANTI-HIJACKING SECURITY DEVICE, KIT AND METHOD

FIELD OF THE INVENTION

The present invention relates anti-crime devices, more particularly, to an anti-hijacking security device attached to an airplane, an associated kit and an associated method of using the kit for use in incapacitating a hijacker by selectively releasing an incapacitating chemical agent within the confines of the airplane.

DESCRIPTION OF THE PRIOR ART

Currently, there has arisen a serious problem of hijacking and attempted hijacking of airplanes. Extensive efforts have been made heretofore to prevent airplane hijacking in view of the obvious danger it presents, as well as the expense and inconvenience. One approach has been to detect the presence of weapons on passengers entering the aircraft. Another has been to provide guards on the flights.

One approach has been to use the so-called frisk machines utilized for detecting concealed weapons on passengers are incapable of detecting plastics. Yet, many weapons adequate to support a hijacking effort can be made of plastics and additionally, can be quite small, thereby avoiding detection by machine or visually. These detection systems, even assuming that they could be developed to detect all possible materials from which weapons might be formed are still undesirable in view of the initial cost of installation thereof and the continuing maintenance cose and requirement for maintaining guards to apprehend those passengers carrying articles detected by the equipment.

Another approach has been to implement armed guards on the flights. Armed guards are also not an ideal solution because they presents a substantial cost as well as present substantial dangers themselves. An exchange of gun fire with a would be hijacker in the confined area of the cabin of an airplane could itself be fatal to many passengers, as well as presenting the danger of puncturing the fuselage of the plane and possibly cause it to crash.

A wide variety of security devices is currently available on the commercial market and an even larger number of these types of devices are known in the art of security devices, for example, the aircraft anti-hijacking structure disclosed by Anderson in U.S. Pat. No. 3,658,277; the airplane hijacking prevention system disclosed by Ord in U.S. Pat. No. 3,704,845; the antihijacking system for aircraft disclosed by Pizzo in U.S. Pat. No. 3,811,643; the surveillance and weapon system disclosed by Garehime, Jr. in U.S. Pat. No. 4,112,818; the aircraft surveillance and recording system disclosed by Lee in U.S. Pat. No. 5,742,336; and the airplane disclosed by Inoue in U.S. Pat. No. D351,131.

While all of the above-described devices fulfill their respective, particular objectives and requirements, the aforementioned patents do not describe an anti-hijacking security device having a interconnected components of a pressurized gas container, an incapacitating chemical agent, and an emergency control system. This combination of elements would specifically match the user's particular individual needs of making it possible to provide a convenient means of incapacitating a hijacker by selectively releasing the incapacitating chemical agent within the confines of an airplane. The above-described patents make no provision for a interconnected components of a pressurized gas container, an incapacitating chemical agent, and an emergency control system.

Therefore, a need exists for a new and improved anti-hijacking security device having interconnecting components of a pressurized gas container, an incapacitating chemical agent, and an emergency control system. In this respect, the anti-hijacking security device according to the present invention substantially departs from the conventional concepts and designs of the prior art, and in doing so provides an apparatus primarily developed for the purpose of providing a convenient means of incapacitating a hijacker by selectively releasing the incapacitating chemical agent within the confines of an airplane.

SUMMARY OF THE INVENTION

The present device, kit and method of using, according to the principles of the present invention, overcomes the shortcomings of the prior art by providing a anti-hijacking security device, kit and method of using the kit are disclosed for use in thwarting a highjacking event within an airplane. The device includes the interconnected components of a pressurized gas container, an incapacitating chemical agent, and an emergency control system. The pressurized gas container is operatively connected to the internal air ventilation system of the airplane. The incapacitating chemical agent is stored within the pressurized gas container. The emergency control system includes a gas release switch operatively connected to the pressurized gas container for the controlled release of the incapacitating chemical agent through the air ventilation system in the airplane. The kit includes the unconnected components of the device. The method of using the kit includes the steps of adjoining, affixing, assembling, attaching, bolting, connecting, coupling, erecting, fastening, joining, linking, locking, mounting, obtaining, and welding.

In view of the foregoing disadvantages inherent in the known type anti-hijacking devices now present in the prior art, the present invention provides an improved anti-hijacking security device, which will be described subsequently in great detail, is to provide a new and improved anti-hijacking security device which is not anticipated, rendered obvious, suggested, or even implied by the prior art, either alone or in any combination thereof.

To attain this, the present invention essentially comprises a the interconnected components of a pressurized gas container, an incapacitating chemical agent, and an emergency control system.

There has thus been outlined, rather broadly, the more important features of the invention in order that the detailed description thereof that follows may be better understood, and in order that the present contribution of the art may be better appreciated.

The invention may also include camera system. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved anti-hijacking security device that has all the advantages of the prior art anti-hijacking security device and none of the disadvantages.

It is another object of the present invention to provide a new and improved anti-hijacking security device that may be easily and efficiently manufactured and marketed.

An even further object of the present invention is to provide a new and improved anti-hijacking security device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new anti-hijacking security device that provides in the apparatuses and methods of the prior art some of the advantages thereof, while simultaneously overcoming some of the disadvantages normally associated therewith.

Even still another object of the present invention is to provide a anti-hijacking security device having a interconnected components of a pressurized gas container, an incapacitating chemical agent, and an emergency control system. This combination of elements makes it possible to provide a convenient means of incapacitating a hijacker by selectively releasing the incapacitating chemical agent within the confines of an airplane.

Still another object of the present invention is to provide a kit comprising the unassembled components of the device.

Lastly, it is an object of the present invention to provide a new and improved method of using comprising the steps of adjoining, affixing, assembling, attaching, bolting, connecting, coupling, erecting, fastening, joining, linking, locking, mounting, obtaining, and welding.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a portion of an preferred embodiment of the anti-hijacking security device constructed in accordance with the principles of the present invention;

FIG. 2 is a view of an optional bulkhead door of a preferred embodiment of the anti-hijacking security device of the present invention;

The same reference numerals refer to the same parts throughout the various figures.

DETAILED DESCRIPTION OF THE PREFERRED EMBODIMENT

Figure 3:
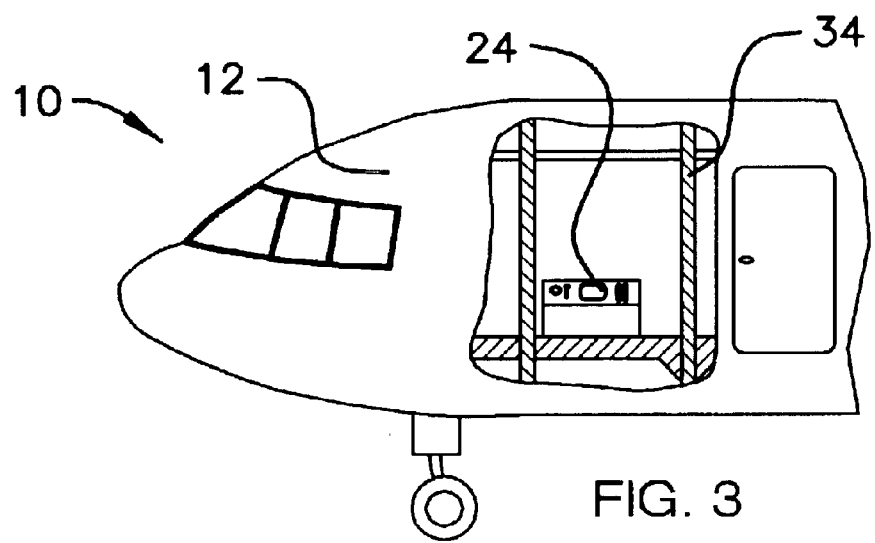
FIG. 3 is a side view of a portion of a preferred embodiment of the anti-hijacking security device of the present invention.

Referring now to the drawings, and in particular FIGS. 1 to 5 thereof, one preferred embodiment of the present invention is shown and generally designated by the reference numeral 10. One preferred embodiment of a security device 10 for use in thwarting a hijacking event within an airplane 12 having an internal air ventilation system 14, the device 10 comprising: a pressurized gas container 16, an incapacitating chemical agent 40, and an emergency control system 18. The pressurized gas container 16 is attached to the airplane 12, wherein the pressurized gas container 16 is operatively connected to the internal air ventilation system 14. The incapacitating chemical agent 40 stored within the pressurized gas container 16. The emergency control system 18 is attached to the airplane 12, wherein the emergency control system 18 having a gas release switch 20 operatively connected to the pressurized gas container 16.

Another preferred embodiment of the device 10 consist essentially of a pressurized gas container 16, an incapacitating chemical agent 40, and an emergency control system 18.

An optional camera system 22 and a video monitor 24 may be added to the device 10 in which the camera system 22 is attached to the airplane 12; and the emergency control system 18 includes the video monitor 24 operatively connected to the camera system 22.

An optional emergency bulkhead door 28 and a drop door switch 26 may be added to the device 10 in which bulkhead door 28 slidably attached the airplane 12; and the emergency control system 18 includes the drop door switch 26 operatively attached to the bulkhead door 28. The bulkhead door 28 is slidably attached the airplane 12. When the bulkhead door 28 is slidably stored in an overhead compartment in the airplane 12 then the bulkhead is in a raised position. When the bulkhead door 28 is slidably lowered across a portion of a passenger cabin of the airplane 12 then the bulkhead door 28 is in a sealed position.

An optional security wall 30, hinge 32, bullet proof door 34, bullet proof window 36, and lock 38 may be added to the device 10 in which the security wall 30 is attached to a forward section of the airplane 12; the hinge 32 is attached to the security wall 30; the bullet proof door 34 is attached to the hinge 32; the bullet proof window 36 attached to the bullet proof door 34; and the lock attached to the bullet proof door 34 and attached to the forward section of the airplane 12.

The incapacitating chemical agent 40 may comprise any commercially available incapacitating chemical agent 40. One preferred configuration of the incapacitating chemical agent 40 comprising a volatile anaesthetic selected from the group consisting of adamsite (10-chloro-5,10-dihydrophenarsazine); desflurane (1,2,2,2-tetrafluoroethyl difluoromethyl ether); enflurane (2-chloro-1,1,2-trifluoroethyldifluoromethyl ether); halothan (2-bromo-2-chloro-1,1,1-trifluoroethane); isoflurane (1-chloro-2,2,2-trifluoroethyldifluoromethyl ether), nitrous oxide; and sevoflurane (1,1,1,3,3,3-hexafluoro-2-propyl ether). Another preferred configuration of the incapacitating chemical agent 40 comprising an aerosolized opiate selected from the group consisting of etorphine hydrochloride, codeine, morphine, and heroin. Still another preferred configuration of the incapacitating chemical agent 40 comprising a disorienting agent selected from the group consisting of BZ (3-quinuclidinyl benzilate) and LSD (N,N-diethyl-D-lysergamide). Yet another preferred configuration of the incapacitating chemical agent 40 comprising a tear agent selected from the group consisting of 1-(4-chlorophenyl) ethanone and 2-chloro-1-phenylethanone. Even yet another preferred configuration of the incapacitating chemical agent 40 comprising a chemical warfare agent selected from the group consisting of VX (methylphosphonothioic acid S-2-[bis(1-methylethyl)amino]ethyl] O-ethyl ester); Sarin (methylphosphonofluoridic acid 1-methyl-ethyl ester); and Tabun (Dimethyhlphosphoramidocyanidic acid).

One preferred embodiment of a kit for assembling a security device 10 to an airplane 12 having an internal air ventilation system 14 for use in thwarting a hijacking event within the airplane 12, the kit comprises a pressurized gas container 16; an incapacitating chemical agent 40 stored within the pressurized gas container 16; and an emergency control system 18 having a gas release switch 20 operatively connectable to the pressurized gas container 16.

Another preferred embodiment of a kit consists essentially of a pressurized gas container 16; an incapacitating chemical agent 40 stored within the pressurized gas container 16; and an emergency control system 18 having a gas release switch 20 operatively connectable to the pressurized gas container 16.

An optional camera system 22 and video monitor 24 may be added to the kit in which the the emergency control system 18 includes a video monitor 24 operatively connectable to the camera system 22.

An optional bulkhead door 28 and an associated drop door switch 26 may be added to the kit in which the emergency control system 18 includes a drop door switch 26 operationally connectable to the bulkhead door 28 wherein the bulkhead door is slidably attachable to the airplane 12.

An optional security wall 30, hinge 32, bullet proof door 34, bullet proof window 36, and lock 38 may be added to the kit in which the security wall 30 is attachable to a forward section of the airplane 12; the hinge 32 is attachable to the security wall 30; the bullet proof door 34 is attachable to the hinge 32; the bullet proof window 36 is attachable to the bullet proof door 34; and the lock 38 is attachable to the bullet proof door 34 and attachable to the forward section of the airplane 12.

One preferred embodiment of a method of using kit for constructing a security device 10 to an airplane 12 having an internal air ventilation system 14 for use in thwarting a hijacking event within the airplane 12, the method comprising the steps of: adjoining, affixing, assembling, attaching, bolting, connecting, coupling, erecting, fastening, joining, linking, locking, mounting, obtaining, and welding. The obtaining step comprises obtaining the kit comprising: a pressurized gas container 16; an incapacitating chemical agent 40 stored within the pressurized gas container 16 wherein the incapacitating chemical agent 40 comprising a volatile anaesthetic selected from the group consisting of adamsite (10-chloro-5,10-dihydrophenarsazine); desflurane (1,2,2,2-tetrafluoroethyl difluoromethyl ether); enflurane (2-chloro-1,1,2-trifluoroethyldifluoromethyl ether); halothan (2-bromo-2-chloro-1,1,1-trifluoroethane); isoflurane (1-chloro-2,2,2-trifluoroethyldifluoromethyl ether); nitrous oxide, and sevoflurane (1,1,1,3,3,3-hexafluoro-2-propyl ether); an emergency control system 18 having a gas release switch 20 operatively connectable to the pressurized gas container 16; a camera system 22; the emergency control system 18 having a video monitor 24 operatively connectable to the camera system 22; the emergency control system 18 having a drop door switch 26; a bulkhead door 28 slidably attachable to the airplane 12 and operationally connectable to the drop door switch 26; a security wall 30 attachable to a forward section of the airplane 12; a hinge 32 attachable to the security wall 30; a bullet proof door 34 attachable to the hinge 32; a bullet proof window 36 attachable to the bullet proof door 34; and a lock 38 attachable to the bullet proof door 34 and attachable to the forward section of the airplane 12. The adjoining step comprises adjoining the pressurized gas container 16 to the airplane 12. The affixing step comprises affixing operatively the pressurized gas container 16 to the internal air ventilation system 14 of the airplane 12. The attaching step comprises attaching the emergency control system 18 to the airplane 12. The linking step comprises linking operatively the gas release switch 20 to the pressurized gas container 16. The assembling step comprises assembling together the bulkhead door 28 to the airplane 12 so that the bulkhead door 28 is slidably stored in an overhead compartment in the airplane 12 in a raised position, and so that the bulkhead door 28 can be is slidably lowered across a portion of a passenger cabin of the airplane 12 into a sealed position. The coupling step comprises coupling operatively the drop door switch 26 of the emergency control system 18 to the bulkhead door 28. The fastening step comprises fastening the security wall 30 to a forward section of the airplane 12. The bolting step comprises bolting on the hinge 32 to the security wall 30. The joining step comprises joining the hinge 32 to the bullet proof door 34. The mounting step comprises mounting a bullet proof window 36 to the bullet proof door 34. The welding step comprises welding the lock 38 onto the bullet proof door 34. The locking step comprises locking securely the lock 38 to the security wall 30. The erecting step comprises erecting together the camera system 22 onto the airplane 12. The connecting step comprises connecting operatively the camera system 22 to the video monitor 24 of the emergency control system 18.

An optional additional set of steps may be further added to the above method comprising the steps of activating, enabling, opening, rushing, turning, tying, unlocking, venting, viewing, and watching. The viewing step comprises viewing at the video monitor 24 to see a person hijacking the airplane 12. The enabling step comprises enabling the drop door switch 26 of the emergency control system 18 to move the bulkhead door 28 from the raised position to the sealed position. The activating step comprises activating the gas release switch 20 to release a portion the incapacitating chemical agent 40 stored within the pressurized gas container 16 into the airplane 12 through the air ventilation system 14, the activating step performed subsequent to the enabling step. The watching step comprises watching through the bullet proof window 36 the hijacker loose consciousness from being exposed the incapacitating chemical agent 40, the watching step performed subsequent to the activating step. The turning step comprises turning off the gas release switch 20 to stop the release of the incapacitating chemical agent 40 stored within the pressurized gas container 16, the turning step performed subsequent to the watching step. The venting step comprises venting the airplane 12 with fresh air, the venting step performed subsequent to the turning step. The unlocking step comprises unlocking the lock 38 from the security wall 30, the unlocking step performed subsequent to the venting step. The opening step comprises opening pivotally the bullet proof door 34, the opening step performed subsequent to the unlocking step. The rushing step comprises rushing over to the unconscious hijacker, the rushing step performed subsequent to the opening step. The tying step comprises tying up the unconscious hijacker, the tying step performed subsequent to the rushing step.

Another preferred embodiment of the method consists essentially of the steps of adjoining, affixing, assembling, attaching, bolting, connecting, coupling, erecting, fastening, joining, linking, locking, mounting, obtaining, and welding.

Still another preferred embodiment of the method consists essentially of the steps of activating, adjoining, affixing, assembling, attaching, bolting, connecting, coupling, enabling, erecting, fastening, joining, linking, locking, mounting, obtaining, opening, rushing, turning, tying, unlocking, venting, viewing, watching, and welding.

Referring now to FIG. 1 which depicts a side view of a portion of an preferred embodiment of the anti-hijacking security device 10 mounted within an airplane 12 having an internal air ventilation system 14. The device 10 is shown having a pressurized gas container 16, an incapacitating chemical agent 40, and a camera system 22.

Referring now to FIG. 2 which depicts a view of an optional bulkhead door 28 of a preferred embodiment of the anti-hijacking security device 10. When the bulkhead door 28 is slidably stored in an overhead compartment in the airplane 12 then the bulkhead is in a raised position. When the bulkhead door 28 is slidably lowered across a portion of a passenger cabin of the airplane 12 then the bulkhead door 28 is in a sealed position.

Referring now to FIG. 3 which depicts a side view of a portion of a preferred embodiment of the anti-hijacking security device 10 showing an emergency control system 18 and cross sectional view of an optional security wall 30.

Figure 4:
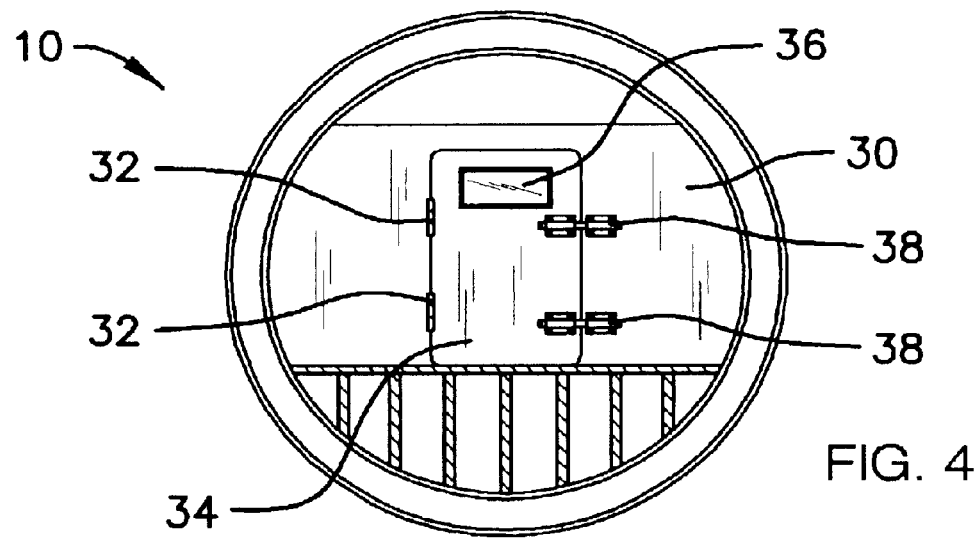
FIG. 4 is a view of an optional bullet proof door of a preferred embodiment of the anti-hijacking security device of the present invention.

Referring now to FIG. 4 which depicts a front view of an optional security wall 30, hinge 32, bullet proof door 34, bullet proof window 36, and lock 38 of the device 10.

Figure 5:
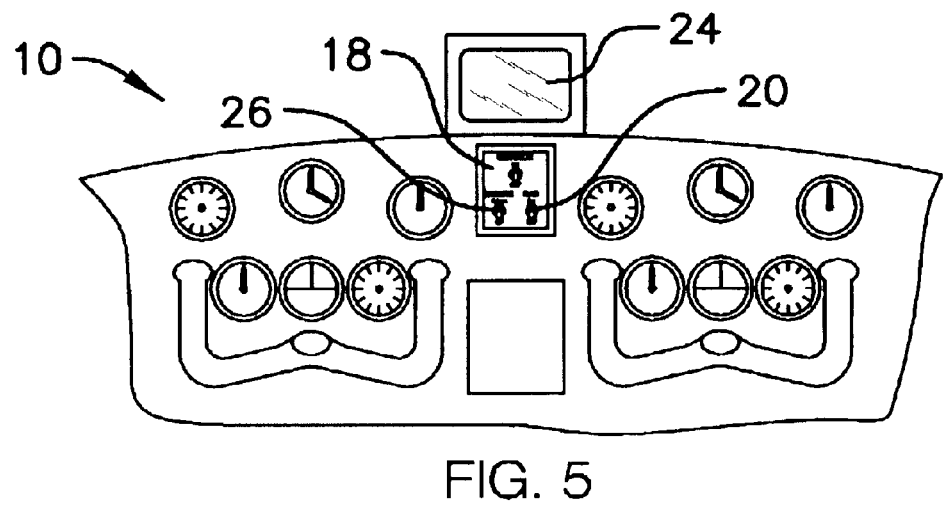
FIG. 5 is a view of a portion of a preferred embodiment of the anti-hijacking security device of the present invention.

Referring now to FIG. 5 which depicts a cockpit view of a portion of a preferred embodiment of the anti-hijacking security device 10 showing an emergency control system 18 having a gas release switch 20, a drop door switch 26 and a video monitor 24.

As to the manner of usage and operation of the present invention, the same should be apparent from the above description. Accordingly, no further discussion relating to the manner of usage and operation will be provided.

While a preferred embodiment of the anti-hijacking security device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of using kit for constructing a security device to an airplane having an internal air ventilation system for use in thwarting a hijacking event within the airplane, said method comprising the steps of:

obtaining the kit comprising:
  a pressurized gas container;
  an incapacitating chemical agent stored within said pressurized gas container wherein said incapacitating chemical agent comprising a volatile anaesthetic selected from the group consisting of adatasite (10-chloro-5,10-dihydrophenarsazine); desflurane (1,2,2,2-tetrafluoroethyl difluoromethyl ether); enflurane (2-chloro-1,1,2-trifluoroethyldifluoromethyl ether); halothan (2-bromo-2-chloro-1,1,1-trifluoroethane); isoflurane (1-chloro-2,2,2-trifluoroethyldifluoromethyl ether); nitrous oxide; and sevoflurane (1,1,1,3,3,3-hexafluoro-2-propyl ether);
  an emergency control system having a gas release switch operatively connectable to said pressurized gas container;
  a camera system;
  said emergency control system having a video monitor operatively connectable to said camera system;
  said emergency control system having a drop door switch;

a bulkhead door slidably attachable to the airplane and operationally connectable to said drop door switch;

a security wall attachable to a forward section of the airplane;

a hinge attachable to said security wall;

a bullet proof door attachable to said hinge;

a bullet proof window attachable to said bullet proof door; and a lock attachable to said bullet proof door and attachable to the forward section of the airplane;

adjoining the pressurized gas container to the airplane;

affixing operatively said pressurized gas container to the internal air ventilation system of the airplane;

attaching the emergency control system to the airplane;

linking operatively the gas release switch to the pressurized gas container;

assembling together the bulkhead door to the airplane so that said bulkhead door is slidably stored in an overhead compartment in the airplane in a raised position, and so that said bulkhead door can be is slidably lowered across a portion of a passenger cabin of the airplane into a sealed position;

coupling operatively the drop door switch of the emergency control system to the bulkhead door;

fastening the security wall to a forward section of the airplane;

bolting on the hinge to the security wall;

joining the hinge to the bullet proof door;

mounting a bullet proof window to the bullet proof door;

welding the lock onto the bullet proof door;

locking securely the lock to the security wall;

erecting together the camera system onto the airplane; and connecting operatively the camera system to the video monitor of the emergency control system.

2. The method of claim 1 further comprising:

viewing at the video monitor to see a person hijacking the airplane;

enabling the drop door switch of the emergency control system to move the bulkhead door from the raised position to the sealed position;

activating the gas release switch to release a portion the incapacitating chemical agent, stored within said pressurized gas container into the airplane through the air ventilation system, said activating step performed subsequent to said enabling step;

watching through the bullet proof window the hijacker loose consciousness from being exposed the incapacitating chemical agent, said watching step performed subsequent to said activating step;

turning off the gas release switch to stop the release of the incapacitating chemical agent stored within the pressurized gas container, said turning step performed subsequent to said watching step;

venting the airplane with fresh air, said venting step performed subsequent to said turning step;

unlocking the lock from the security wall said unlocking step performed subsequent to said venting step;

opening pivotally the bullet proof door, said opening step performed subsequent to said unlocking step;

rushing over to the unconscious hijacker, said rushing step performed subsequent to said opening step; and tying up the unconscious hijacker, said tying step performed subsequent to said rushing step.

* * * * *